US007563340B2

(12) United States Patent
Peterson

(10) Patent No.: US 7,563,340 B2
(45) Date of Patent: Jul. 21, 2009

(54) SYSTEM AND METHOD FOR MANUFACTURING COINS, STORYBOARDS, MEMORY MONEY, COLLECTORS ITEMS, AND TROPHIES

(75) Inventor: Diane L. Peterson, Addison, TX (US)

(73) Assignee: !Bujubojb!Me, L s/hf swimfn- Uf ybt ( * ) Notice: Subject to any disclaimer, the term of this patent is extended or adjusted under 35 U.S.C. 154(b) by 42 days.

(21) Appl. No.: 10/971,553

(22) Filed: Oct. 21, 2004

(65) Prior Publication Data

US 2005/0173054 A1 Aug. 11, 2005

Related U.S. Application Data

(60) Provisional application No. 60/513,352, filed on Oct. 21, 2003.

(51) Int. Cl.
*B29C 65/74* (2006.01)
*B32B 37/02* (2006.01)
*B32B 38/04* (2006.01)
*B32B 38/10* (2006.01)

(52) U.S. Cl. ..................... 156/263; 156/264; 156/272.8

(58) Field of Classification Search ................. 156/512, 156/252, 256, 261, 264, 272.8, 308.4, 263; 40/27.5, 124.5; 428/542.4, 542.6; 219/121.6, 219/121.67, 121.68, 121.7, 121.71, 121.72
See application file for complete search history.

(56) References Cited

U.S. PATENT DOCUMENTS

| | | | | | |
|---|---|---|---|---|---|
| 3,591,943 | A * | 7/1971 | Green | ........................ | 40/615 |
| 3,918,188 | A * | 11/1975 | Drower et al. | ................ | 40/789 |
| 4,304,809 | A * | 12/1981 | Moraw et al. | ............ | 428/195.1 |
| 5,306,049 | A * | 4/1994 | Schireck | ...................... | 283/74 |
| 5,364,482 | A * | 11/1994 | Morikawa et al. | ........... | 156/182 |
| 5,609,967 | A * | 3/1997 | Matsunami | ................. | 428/601 |
| 6,093,273 | A * | 7/2000 | Lee | ............................ | 156/230 |
| 6,727,463 | B2 * | 4/2004 | Feistel et al. | ........... | 219/121.78 |
| 6,780,273 | B1 * | 8/2004 | Bradford | ..................... | 156/257 |
| 7,078,085 | B2 * | 7/2006 | Nykamp et al. | ............... | 428/99 |
| 2003/0084596 | A1 * | 5/2003 | Zurawski et al. | ............. | 40/27.5 |

* cited by examiner

*Primary Examiner*—Philip C Tucker
*Assistant Examiner*—Sing P Chan
(74) *Attorney, Agent, or Firm*—Ul Psqf Opsui ' X Ftufso Mmq

(57) ABSTRACT

A system and method is provided for manufacturing a memory bill. The method can include the operation of creating a template for displayed face of the memory bill. Another operation can be cutting out the displayed face of the memory bill. Yet another operation can be adhering the displayed face to a center substrate in the memory bill. A further operation can be creating a template for a back face for a memory bill. The back face for the memory bill can be cut out, and the back face can be adhered to the center substrate for the memory bill.

8 Claims, 5 Drawing Sheets

SYSTEM AND METHOD FOR MANUFACTURING COINS, STORYBOARDS, MEMORY MONEY, COLLECTORS ITEMS, AND TROPHIES

This non-provisional application claims priority to a U.S. Provisional Application No. 60/513,352 filed on Oct. 21, 2003.

BACKGROUND

Most people are sentimental to one degree or another. As a result of this human quality of sentimentality, individuals like to purchase objects that they associate with events or people in their life. For example, when individuals graduate from school training, such as high school or college, quite often they will purchase a class ring. Unfortunately, women do not like class rings because they are quite bulky and relatively expensive. In addition, they are typically not beautiful or a quality jewelry item. This does not mean that women or even men have not had a good school experience but this means they do not like the specific memory item associated with their schooling.

There are also other memory items that individuals like to collect. Examples of these are thimbles, spoons, cups, cards, hats, shirts and similar items that are based on a location a person has visited. Although these items identify a specific location, they do not have any further date markings, manufacturing location markings, or other type of item of interest associated with the goods. Most of the items that are collected by individuals are random odds and ends that are eventually stuffed away in a drawer. The reason they are eventually put in a box is because they are not that beautiful or interesting anyway. Eventually these items collect dust and are discarded. It is unfortunate that these items, which are associated with good memories, are discarded because it would be valuable to have items that could be displayed for many years or that are beautiful and can be mounted on a wall. Even items that are expensive may collect dust or break and then be discarded.

DETAILED DESCRIPTION

Figure 1:
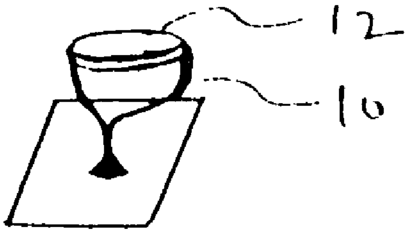
FIG. 1 is diagram showing a coin holder holding a coin.

The present invention provides an item or device that marks a timeline for a person's life or specific events associated with a person's life. In addition, the present invention provides items that have a consistent branding and look and feel to the items.

No company markets their products around currency. The present invention looks at the currency and their devices across the markets like the jewelry department and many others.

The coins of the present invention will be serialized and contain typing or engravings that are associated with specific dates, times, people, etc. These coins, boxes and frames help display the memories and events that occur in an individual's life. These items can be collected and displayed together in a pleasing manner.

In the past, private coins, such as tokens have not been considered jewelry, but government coins have been used as jewelry. The present invention includes coins that can be worn as bracelets, necklaces, earrings, or in other ways suitable for an individual wearer. In the past, people have traded in monetary coins because the monetary coins were serialized, dated, related to a specific foundry, and had inherent value. Other types of medallions also exist on the market but these are merely decorative and are not associated with the dates of a person's life.

Individuals desire to have a relatively less expensive product that can be purchased to represent a person's life history. The coins of the present invention can be marked for events that exist between life and death. The coins will be dated based on the specific life event. A brand can also be associated with these coins, other currency and any collectible. These coins can be double sided and have either printing, embossing, sculpturing, engraving or any other process on each side of the piece of jewelry. In the past, jewelry has not had double-sided decorative features. Typically a locket or some similar item will be engraved or sculptured on one side but not on both. The double-sided engravings allow life events and other similar important information to be located on both sides of the coin or jewelry. The jewelry and collectibles markets have not used currency and branding to develop a retail line of currency based jewelry. Jewelry has not used manufactured printed items like laser printing as a part of its product or the process. The jewelry market does not use materials like aluminum or paper to create its products. They have not found a way to incorporate them into the process. The jewelry does not have a consistent look and feel. Jewelry is not collectible, or detachable and rearrangable. The brand is not on the outside of jewelry. This applies to any market.

Several particular embodiments of the invention will now be described. One embodiment of the invention is a coin to record an individual's life history. These coins can represent important events in a person's life. The coins are relatively inexpensive but are valuable because they are created from precious metals, stones and other similar items. Each coin will have a consistent look and feel for the line of coins. The coins can be various sizes, shapes and colors as determined by the specific line of coins. The coins can use any attaching devices, such as retaining brackets, mini-frames, etc, to attach the coins to items such as trophies or collectibles. This allows for the object to be collectible and rearrangable.

Each of the coins will have a serial number engraved or sculpted onto the coin. In the past, coins and jewelry that have been sold on the market have not had serial numbers. The serial numbers can be formatted in any number of different ways. One particular formatting that captures a number of items of interest is a serialization that contains the following important information:

- A batch number, which represents a manufacturing run;
- A mold number, which is the device, machine or mold that has made the product;
- A sequence number, which is the actual item;
- An event number, which represents the event in life that is being recognized;
- A design number which represents the location where the item has been designed;
- A cast number, which represents the location where the item has been cast;
- Other IDs numbers used for tracking, production, sales or other processes.

The coins in the present invention can be used to create a calendar based on a timeline of a person's life. For example, an individual coin can represent an anniversary, a birthday, or other events that are pertinent to an individual's life. The coins can also be related to other events such as awards for service, length of service, excellence in a specific area. In addition, the coins may represent businesses that a person has worked for or businesses that a person has done business with. These numbers can use the universal classification language or any other number system.

Being able to provide a coin for these different life events allows individuals to provide a gift for the person who has everything. It also allows these special coins to be displayed together in a frame or some other wall hanging.

In an alternative embodiment of the invention, a coin can be created for each person in a family. For example, mother, father, children, grandparents and extended family and these coins can be displayed in a family tree.

The coins do not necessarily have to be solid and they can have holes or be made of a variety of combined materials. For example, a coin can have stones, precious gems or other materials combined into the coin. Regardless of what the coin is made of, the coin will describe when it was made, where it was made, and what meaningful events in an individual's life that the coin represents. These coins become historical markers. In addition, the coin may also include the person who gave the gift. Alternatively, the company who sells the coin can track the gift giver and gift receiver in a database.

Another alternative use of the coin is to certify specific stories and memories associated with unique products such as antiques, rocks, pets, children, and memorabilia.

There are three types of coins that can be produced for memory coins. There is a one-sided coin, a two-sided coin, and no-sided coin. In some situations, the coin will have a branding or specific stylization on the back of the coin. If it is a one-sided coin, then the back may just be a finished face. If it is no-sided, material can be applied on both sides. On a two-sided coin, it can carry the branded on both sides. The brand can go on the front or back. Note: The coin can have more than two sides. The coins have N-variation with the N-assembly.

The coin can be marked with certain acronym letters to represent the type of coin it is. These markings will be M for memory coin, E for a limited edition coin, L for licensed coin, and O for an original coin. These markings are used to show the value of the coin.

Bezels can also be included on the coin. A bezel or beveled edge can be included on one side of the coin to attach the coin to other products or material. This bezel can be used with a hook or other connection item to attach the coin to other jewelry or similar material. The crystal can be on one, both or all sides. A bezel can be one way to attach the item. There are N-variations to attach the item to other items.

Another item that can be included as a memory item is a two-sided picture frame. In the past, people have only had one-sided picture frames that are decorated on a single side. These two-sided picture frames will be used to display coins. Thus, the two-sided picture frames will complement the two-sided coins.

Two-sided creates two-sided mat board and other two sided material. The board can be with any process. It can be coated with plastic to make it waterproof. The matte board can be made out of material other than paper.

Another part of the memory items and system are memory boxes. These boxes may be imprinted with serial numbers and/or events in a similar fashion as the coins. The boxes and frames can be marked with special events in a person's life.

Memory devices can also be provided for conferences, events or other special meetings. For example, a person can receive a coin and a badge together or a coin embedded in a badge to help remember a high level technical conference or a conference where they presented a paper. Memory devices can be badges, bands, cards, and many other devices.

These badges for events can also be used to control restricted items. For example, colored coins can be given to individuals who are of age to purchase controlled substances, such as alcohol at an event (e.g., a state or county fair). In addition to a colored coin a person may receive a colored band based on the day's date. The band will have unique information to identify an individual and the person who receives the band can fill out an entry form with personal information. This aids law enforcement to track such persons and it allows insurance companies to lower the liability of costs at events such as sporting events, fairs, and other areas where controlled substances are sold. These tracking devices are technology independent. Any technology can be used.

Another embodiment of the memory coin is a birthday collection. A birth coin can be created for an individual, including their birth date, where that person was born, and the coin can be serialized. This birth date coin can be the beginning of a lifetime set of coins that an individual collects and displays.

The currency markets have not traditionally used mixed materials. In addition, the currency markets and those skilled in the art of jewelry have not used laser engraving technology or print technology, because gold, silver, and other metals reflect lasers and this engraving technology cannot engrave these highly reflective items.

To get a consistent look and feel, the invention can cross several markets. The present invention applies to the memorabilia market, the trophy market, the jewelry market, the currency market, the promotions market, identification market, the packaging market, the labeling market, the identification market, the apparel market, etc.

One problem with the memorabilia market is there is no consistent branding across the market. The identifications of the present invention can be used with shirts, tokens, caps, thimbles, and other products used as memorabilia and promotional material. For example, each of Disney's products is marked with different labels and styling. Products like Disney have not been used for awards programs in a company. Without the technical assembly process of the present invention, customization to coins, jewelry and collectibles is difficult to provide. An example is creating T-shirts, currency, thimbles, and other products in an assembly process, which allows dates, events names, and personal information to be added.

In the past, companies have not been able to market life to death products because it was too expensive to make customized items. There have been no organizations, companies or other entities that focus on life to death events. Companies focus on the event. All entities do not create a product line or lines around birth to death events. The memorabilia has not been personalized, branded, dated, certified, registered, described, and sequenced, to make the items more collectible. An example of this is where a buyer goes to auctions and buys items with no history and no processing to certify the collectability of the item. The reason auction items are not certified is that it takes time.

People shop for memorabilia, awards, and other items around life events. When a company takes the time to market for lifetime events, items move in a more consistent look and a consistent brand. When a company takes the time to promote for lifetime events, then awards programs can be created for groups of people surrounding these events. The boxes and the frames along with the currency created a program. This is an awards program. When there is a program involved, the customer becomes a lifelong customer. Using a currency program teaches children the values of earning money. The award program has two values. The program has value because it is a part of the scholarship, grant, etc. to gain monetary gain. The program gives people the ability to further themselves.

Many manufacturers do not have consistent trademarks. This invention describes one-tiered, two-tiered and three-tiered trademarks. Each trademark has one two-tiered and three-tiered trademark. One trademark is the long version, which is three-tiered trademark; one is the short version, which is two-tiered trademark; and one is the initial version, which is the one-tiered trademark. There are no tiered trademarks. This present invention uses the N-tiered trademark.

There are no tracking devices that use memorabilia. The memorabilia of this invention is removable and detachable. The products can be detached and reorganized. This is a way to promote good different activities from public relations to tracking devices.

The problem with the currency market is that is too expensive to manufacture just a few currency items. The N-assembly method of the present invention cuts the cost down. The costs of currency production are high when the initial concept of the product is developed. In addition, the coin casting plates can break several times before a production run is done. The present method has one or more steps to produce a customized coin. The currency mimics the governmental currency but has no value except for sentimental value.

The jewelry and currency markets do not mix materials like silver and brass. With laser, printing, and other technology, one can mix several different types of materials. No entities have mixed the precious metals with the non-precious metals, the precious metals with other materials, or one process with another process.

The N-layer, N-assembly, N-materials allows for N-variations. To be in the customization market, the manufacturing must be divided into a foundation and customization. You can use on one material, like aluminum with an engraver. The N-assembly allows one process like glass blowing and another process like die stamping to create currency. These processes can be put together any way.

The currency and trophy markets just create their products for award situations. They do not provide programs for long term collectibles. The present invention teaches frames and boxes that are use to collect currency.

In the world today, most companies are trying to promote their product inexpensively. The companies often create a marketplace like a website, storefront, advertising, and other business expenses that run them into the thousands of dollars. That is why people do not get into the memorabilia market. There is no store for memorabilia.

The promotion market does not brand products. They just market them. There is a market in helping other companies and individuals market their products. Individuals have limited success in building name brand recognition. In the market, name brand recognition goes a long way.

With new technology applied to the currency market, the appropriate materials can be developed. Plastics, metals, and other products that are needed for the laser machine are can be coated with double sided plastics and the like. This type of technology can cross markets, like the identification, jewelry, currency, memorabilia, and other markets. The identification market can brand the back of the materials. The identification market is a large market. The badges can have removable parts, so they can collect these badges like a part of their life.

Cards, labels and packaging have not been collectible in the past. They do not have removable parts. People spend a lot of money in special labels and packaging. This present invention can provide artwork with laser, print and any other technology. The labels are removable and branded. What the label market does not have is removable labels and packaging in the memorabilia market. The labels can be one-sided, but two-sided labels are more attractive. This opens up the market to beer holders and other devices that can be adapted for removable labels. Examples are a device holder for the removable label and a means of collecting the labels, such as boxes and frames. The consistent look and feel makes these items more collectible. Individuals save the wrapping paper, cards, and presentation devices in scrapbooks. The artwork is not applied to the packaging and labeling. The labels can be glued or held in a holder.

The memorabilia, apparel and currency markets do not have promotional branding for memorabilia. The memorabilia market has auctions, but they do not have a promotional brand to help them market these products. They do not market these items with information and brands to make the items more collectible. The information may include story, letter of authenticity, and other information. Currency like coins can also be used as removable labels. They can be used as gift tags, cards, and other types of labels.

Method for Manufacturing Memory Currency

No companies use the currency market to develop a product line. The currency market does not have the ability to mark the timeline for a person's life or specific events associated with a person's life. In addition, this market does not have the ability has not taken the time or had the technology to give it a consistent branding, look, and feel to the items. The present invention must have the collectible items, such as currency, stamps, labels, etc. and this creates organizers for collectibles. There are boxes, frames, plaques, etc.

The currency will be serialized and contain typing or engravings that are associated with specific dates, times, people, etc. The currency will be incorporated into preserving the memories, and will reflect the memories and events that occur in an individual's life. Memorabilia along with currency can be collected and displayed together in a pleasing manner. The token market or currency market has the items that most people hold onto for long periods of time.

In the past, private currency, such as tokens have not been considered jewelry, but government coins has been used as jewelry. The present invention includes currency like coins that can be worn as bracelets, necklaces, earrings, or in other ways suitable for an individual wearer. In the past, people have traded in monetary currency because the monetary currency were serialized, dated, related to a specific foundry, and had inherent value. Other types of jewelry like medallions also exist on the market but these are merely decorative and are not associated with the dates of a person's life. The reason, that they have not been considered for jewelry is the cost. The fact that customization has not been possible. With laser, print, and other technologies and processes, the token or currency has the ability to be worn. The customization must be divided from the foundation. The manufacturer or the assembly must be divided. N-assembly and N-layer allows for N-variations for coins.

Individuals desire to have a relatively less expensive product that can be purchased to represent a person's life history. The currency of the present invention can be marked for events that exist between life and death. The currency will be dated based on the specific life event. A brand can also be associated with this currency and any collectible. The currency uses the N assembly method to create and produce it. These currency can be double sided and have either embossing, sculpturing or engraving on each side of the piece of jewelry. In the past, jewelry has not had double-sided decorative features. Typically a locket or some similar item will be engraved or sculptured on one side but not on both. The double-sided engravings allow life events and other similar important information to be located on both sides of the coin or jewelry. The jewelry and product market has not used currency and branding to develop a line.

These coins can be double sided and have either embossing, sculpturing or engraving on each side of the piece of jewelry. Several particular embodiments of the invention will now be described. One embodiment of the invention is a currency to record an individual's life history. This currency can represent important events in a person's life. The currency is relatively inexpensive because the N-Assembly method is used to assemble the currency. Examples are using the foundation and a customization format to create currency. The N assembly method can use any known technical process to layer the currency. A single ID or a plurality of IDs can be used to create serialization.

Regardless of what the currency is made of, the currency will describe when it was made, where it was made, and what meaningful events in an individual's life that the currency represents. The currency becomes historical markers. In addition, the currency may also include the person who gave the gift. Alternatively, the company who sells the currency can track the gift giver and gift receiver in a database.

With customization, the messaging is more open to express personal feelings like "Happy Birthday", "Will you marry me?", and other phrases. With this customization comes a message in whatever product is presented like "Message In A Box".

The currency can be marked with certain acronym letters to represent the type of coin it is. These markings will be M for memory products, E for a limited edition coin, L for licensed coin, and O for an original coin. These markings are used to show the value of the currency.

Bezels can also be included on the currency. A bezel or beveled edge can be included on one side of the currency to attach the coin to other products or material. This bezel can be used with a hook or other connection item to attach the currency to other jewelry or similar material.

The currency can be coated to protect all sides. This coat can be thick or thin. The currency can be enclosed or encased by other product or another material.

The boxes and frames can be marked with special events in a person's life. Another item that can be included as a memory item is a two-sided picture frame. In the past, people have only had one-sided picture frames that are decorated on a single side. These two-sided picture frames will be used to display currency. Thus, the two-sided picture frames will complement the two-sided currency. These frames can be developed many ways. The two-sided frames provide the foundation for the two-sided matte board. It also leads to the development of the use of materials other than paper. The N-assembly method also applies to matte board.

There are two types of frames. There is the grow frame. This frame grows or is extendable as needed. The patchwork frame looks like a quilt and is filled in as needed. The frames can be designed with any technology. The brand tells the customers what frames they are buying.

Another part of the memory items and system are memory boxes. These boxes may be imprinted with serial numbers and/or events in a similar fashion as the currency. The boxes use tabs, protectors, and matte boards. The memory boxes can be made as message boxes with the currency, the matte board, and a box. The boxes can be designed with any technology. The brand tells the customers what boxes they are buying. The boxes are not branded in today's market. These boxes have artwork. The material, shape, and items attached to the box may vary.

Memory badges can also be provided for conferences, events or other special meetings. For example, a person can receive a currency and a badge together or a currency embedded in a badge to help remember a high level technical conference or a conference where they presented a paper.

These badges for events can also be used to control restricted items. For example, colored currency can be given to individuals who are of drinking age to purchase controlled substances, such as alcohol at an event (e.g., a state or county fair). In addition to a colored currency, a person may receive a colored band based on the day's date. The band will have unique information to identify an individual and the person who receives the band can fill out an entry form with personal information. This aids law enforcement in tracking such persons and it allows insurance companies to lower the liability of costs at events such as sporting events, fairs, and other areas where controlled substances are sold.

These badges can be cards, bands, or other types of materials. With the N-assembly method, technology in these badges can take place any where in the currency or around the currency. The badges can be detachable and rearrangable. The can be preserved through other memorabilia products.

Another embodiment of the memory currency is a birthday collection. A birth coin can be created for an individual, including their birth date, where that person was born, and the currency can be serialized. This birth date currency can be the beginning of a lifetime set of coins that an individual collects and displays.

The memory currency like government currency can adapt what is on the coin side, the bill side, credit side, and the debit side. A coin can be made out of plastic, paper, etc. A bill may be made out of metal, a bill may be made of out plastic, etc.

The N-assembly process or method allows for inexpensive messaging. Propaganda or advertising can be used on currency a lot easier. The currency with N-assembly method allows for the customization. This allows for refurbishing. Die stamping and other methods are permanent. When there is customization with a stable foundation, the currency can be refurbished or recycled. The currency can be attached to any product in many ways. It can have hole to attach to a product, or a bezel to attach to jewelry.

Method for Manufacturing Debit and Credit

There is no promotional company that manufacturer a remarked branded of memorabilia. A brand of credit and debit cards can also be produced around people's memories. These cards are used during an event and preserved like the coins and bills. A person might go to the circus and buy a credit or debt card to ride the events. They would be preserved like the entry card, and other devices and processes used to operate at an event. With event driven credit and debt cards, the cards can become memorabilia.

Method for Manufacturing Coin

One of the reasons why there has been no market for custom coins or custom collector's coins is because of the difficulty in manufacturing custom coins at an affordable level. In order to create a coin, there are significant manufacturing setup and mold creation costs. For example, to manufacture a custom coin, an expensive casting mold is often created which can cost hundreds or thousands of dollars.

Alternatively, a stamping method can be used to create coins. Coin stamping includes a significant amount of setup costs and a relatively large number of stamped coins must be made in order to make the setup costs worthwhile (e.g., 1000 coins). This means that someone who desires to make a customized coin at the individual coin level is not able to because of the manufacturing setup costs and the multiple copies which are generally made. It is not generally feasible to manufacture a single coin or a few coins with molding or stamping.

Another method of manufacturing the coin is the method of cloisonné where glass is fused to metal using expensive heating equipment. In this process, a coin is either stamped or cast and then an additional glass part of the coin is melted, fused, or heat fastened to the coin.

The problem with all these manufacturing processes is that they are relatively expensive. In addition, the mindset of coin manufacturers has been that these methods are the primary ways to manufacture coins. The expectation is that coin manufacturers use expensive molds, stamps, or expensive machinery to create coins. Therefore, it is difficult to create an individual custom coin or low volume coins. For example, a coin cannot generally be created economically for an individual or for a single event.

The present invention is a system and method for manufacturing and/or assembling single unique coins or low volume coins in an economical manner. For example, the coins may include a custom birth date, anniversary or some other specific collectible information as discussed previously. The present invention combines the attributes of stamped or cast coins with the customizable aspects of engraving, laser engraving, or customizable stamping.

The present invention includes at least two layers that are combined to create a coin. The first layer is a stamped (front or back), and this first layer can be stamped from a precious or semi-precious malleable material. This stamped or cast part of the coin will be the same for a series of coins that are manufactured. This allows the invention to capture the value of a mass-produced coin. For example, the stamped portion can be stamped from gold, silver, platinum, some other precious metal, semi-precious, or any other material, such as wood, marble, leather, etc. The materials used may be laserable or non-laserable materials. The materials can be anything. The material can be die-stamped or cast. The currency can be made out of wood, marble that are prepared with a process like a laser technology.

A second layer is created (front or back) that is a customized piece for the coin. This is a layer that will have the custom information engraved or laser engraved on the layer. For example, a laser can engrave on aluminum, brass, bronze, or some other metal that is engraveable. In addition to normal engraving, any type of anodized metal or anodized aluminum can be engraved upon. The stamped, cast, or cloisonnéd portioned of the coin (whether front or back) and the customized piece (whether front or back) are combined together by an adhesive layer. Combining these coin pieces together with an adhesive layer avoids the expensive heating or melting processes that are otherwise used in coin manufacturing. In addition, the present invention provides customizable coins in small (or even large) quantities.

The second layer can be the same material as layered one or it can be a different material. The first layer can be aluminum and engraved. It can be another material.

The second layer can be made by using cloisonné, cloisonné epoxy-dome, casting, die struck, die cast, soft-enamel, printed paper, engraved wood, roll and press, and other known processes. The second layer can be soldered or glued to the first layer. There is the foundation layer and the customization layer. In a sense the first layer can be looked at as the foundation layer which has the same look and feel across each coin set. In addition, the customization layer changes and is attached to the foundation. The present invention should not be construed to limit the material that may be used in these layers. The foundation layer can be made out of any type of material, while the customized layer can be made of any type of material and manufactured using any processes that change the coin face.

The N-layer allows customization. An example is aluminum with a leather top for the first layer. There are two layers on the first side. The second layer is plastic. It can be put together with multiple processes. There are three materials: plastic (aluminum and black plastic), leather (tanned), and an aluminum back. Three layers can include plastics, leather, and aluminum. The use of five processes can include: aluminum with plastic, tanned leather, and aluminum die stamped.

One advantage of the present invention is that it is able to provide laser type of engravings in combination with a coin containing precious metal. In the past, it has not generally been possible to provide laser type engravings on silver, gold or other highly reflective precious metals. Thus, the present invention is able to combine precious or fine metals such as silver and gold together with other more customizable and engravable metals such as aluminum, brass, or anodized metal.

Another advantage is now N-material. The product is priced by the material. The N-materials allows for N-variations. The currency does not look the same. An example is one event can have the same cost. But they may all look differently.

It is also possible to cloisonné additional materials on top of the coin faces, into the coin face, or between the sandwiched pieces. This is not necessary but can be used if the appropriate heating and melting equipment is available.

The shape of either side of the coin does not necessarily have to be round. The piece that is stamped, cast or cloisonnéd can be square, irregular or any other artistic or useful shape. Further, the customized piece can be square, irregular or any other artistic or useful shape.

The present invention provides significant advantages over the prior art because in the past manufacturers have not mixed fine metals with laser engraving techniques. This opens up an entirely new manufacturing arena that can include manufactured items such as customized game pieces, jewelry, coin art, or any other electronic media image that could be engraved onto a coin.

Figure 2:
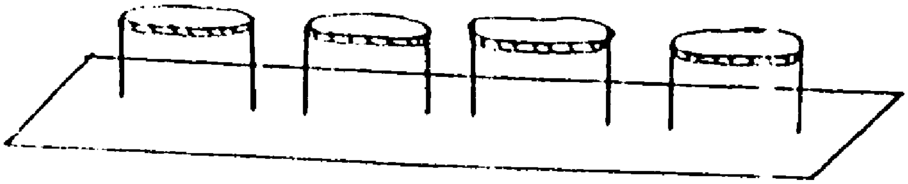
FIG. 2 is a diagram showing a plurality of holders to allow a laser to engrave on multiple coins in a rack.

Although one side of the coin will be stamped or cast, the remaining side of the coin must be prepared for either engraving or lasering. Since these are individual pieces that need to be engraved, it is important to provide an economical way to be able to apply a laser or engraving to the customizable side of the coin. Specifically, the present invention provides for a coin holder for the lasering techniques, a first method of applying a laser to the coin would be to provide an individual holder 10 made of metal to hold the coin 12 as illustrated in FIG. 1. Alternatively, a plurality of holders can be provided to allow a laser to engrave on multiple coins in a rack as in FIG. 2. Alternatively, the coins may be stamped partially out of a single metal sheet with a small portion of the metal attaching the coins to the sheet. After laser engraving, the coins can be either cut or pulled from the sheet.

The present invention enables individuals to further customize the side of the coin with the laser engraving. The customizations that can be added are accomplishments of an individual, awards for individuals, life events or any other customized individual items that a user may desire to put on the customizable side of the coin. In addition, the present invention provides consistency across all the coins. One side can be the stamped fine metal which will be the same for every single coin. The reverse side will be the customizable side. This allows a user to receive a branded coin that is customized for their specific needs on the reverse side. In addition, these customizable coins can be packaged with CDs, books or other collectible items. This way a serialized or customized coin can be provided with a first edition or limited addition collectible media. Moreover, customizable fine coins can be created for memorabilia, fundraisers, celebrities or patriotic events. This customizable coin can be combined with a necklace, a wristband or some other holder that is known to those skilled in the art.

In a further embodiment of the invention, the coin can contain more than three layers. Additional engraveable layers can be layered on the customizable side of the coin. This enables a multi-dimensional effect to be applied to the customizable side of the coin. In addition, the customizable parts of the coin or a segment of a customizable piece of metal could be applied to the side of the coin that contains fine metal. It can be imagined that many shapes or fragmentary parts of a decorative design can be layered on the customizable side of the coin to create an artistic impression.

An additional advantage of the present invention allows a coin manufacturer to combine multiple materials into the coin. For example, one side of the coin may be of precious metal such as platinum, silver or gold, which is the more expensive side of the coin, but the reverse side of the coin is made of a less expensive metal that is customizable and resembles the expensive side of the coin. The value of this is that the coin can be made for a lower cost because only half of the coin is made of the precious metal.

The combination of a pre-made coin face (or back) in combination with a customizable coin back (or face) enables any customer to receive a customizable coin without the cost of casting or molding an entire coin set. Creating a mold for a coin that has limited use costs several hundred dollars. While a mold that is created of materials that can be used in an unlimited process currently costs about $50,000. Thus, the present invention provides a way for multiple individuals to receive their own customized coins without these startup costs.

Another layer that can be contained on the coin is a bezel layer. This bezel layer will most likely be placed over the customizable part of the coin. This bezel allows a crystal or some other glass piece to be applied over the customizable face of the coin. Using a bezel technique helps protect the customized artwork that is applied to the coin. The bezel can also be applied to the precious metal or semiprecious metal face of the coin. The bezel layer can be considered yet another layer of the coin. In the prior art, a coin manufacturer has not been able use a multi-layered coin approach to provide a customized coin for any customer who desires one.

This layered approach enables the manufacturer of the customized coins to recycle coins that have not been used for an event. The more costly part of the coin (e.g., gold, silver, etc.) can be separated from the customized portion of the coin using solvents to remove the adhesive. Then a newly customized piece can be re-attached to the expensive part of the coin. This makes the coins re-usable if they are not sold or given away at a certain event. There are two types of coins that can be produced for memory coins. There is a one-sided coin and a two-sided coin. In some situations, the coin will have a branding or specific stylization on the back of the coin. If it is a one-sided coin, then the back may just be a finished face.

With the printing technology, laser engraving technology and other technologies and other processes, and the N-assembly, the coins cut the cost and time. The laser technology reflects most metals and metals engravers technology only handles outline artwork. When the technology develops further, one machine may be able to handle it. The coins can be engraved straight on the metal or laser N-assembly method. The mix of materials is important because it cuts the cost. The mixing of materials and processing allows for N-variations in the coins.

Marketing Methods for Collectibles/Memorabilia

The product or service market does not provide an item or device that marks a timeline for a person's life or specific events associated with a person's life. Since the present invention includes a different product for each point in time in a person's life, there are also personalized, branded, dated, certificated, registered, sequential items, and other information or processes. In the personalization area, prior memorabilia manufactures have not provided engraving, printing, packaging, etc. which focuses on the life event market. Since there is no present market for timeline events, collectibles and memorabilia do not provide sequence numbering, serialization, certification of the product being sold, or a description of the products or specific events. The current memorabilia market tends to handle memory items one holiday at a time.

The branded market frequently uses one brand name that it is focused on, like Xerox, Pepsi, etc. To aid in entering the collectibles or memorabilia market, the present invention can use a long and short mark that means the same thing. The collectible items can use two marks that mean the same thing. The short mark is used on small surfaces, like jewelry, while longer mark is used on larger surfaces like publications, etc.

Packaging Market

When placing an importance on collectibles, the present invention can also focus on personalization, dates, serialization, branding, descriptions, certifications, and any similar information. This allows the invention described to provide collectable packaging. An example is pre-packaging of give-a-ways. An item can be pre-packed for parties, so the item is at a table and the box has sequential number or collectible coin for each give away item. This gives music sales, movie sales, etc., new ways of marketing. This invention adds a new marketing scheme to the packaging world by adding the customized coin to products.

There are no products that include the markings where: "M" stands for memory product; "E" stands for limited edition; "L" stands for license product and "0" stands for unique. In addition, the type of manufacturing process used has not provided on the label of a product before as in the present invention.

The memorabilia and the packaging market do not take the time for packaging to be a collectible. Sometimes, people wanted to keep a part of their packaging. Packaging does not have removable part. There are areas that allow an individual to keep a part of the packaging.

Memory money can be used to package with an item. Memory creators and memory dolls use the memory currency to name the item, since they can be personalized on the fly.

Each individual can give their item its own name. They difference is that companies such as Tyco sends out Beanie Babies or other toys with their name already included.

Another marketing strategy is multiple trademarks for one item. The trademark is N-tiered. The items have an initial, a short name, and a long name. The long trademark for memory boxes has three parts: “M”, “Memory”, and “Memory Box”. The short trademark for memory boxes has two “M” and “MBox”. The “M” mark the products like jewelry that does not have the room for the other trademarks.

The packaging market does not use laser techniques to create new packaging with artwork that is lasered into the package. The market uses printed artwork only or it is just plain.

Memory money can be as to tag a package. It can be a label.

Promotion Market

The program to collect multiple items does not exist for memorabilia in the trophy market. This program is not found in the jewelry, trophy, collectible, and other markets. The program is a consistent way of awarding people for a job well done. Today’s market sells items for an event, while this invention creates a program for memorabilia, like the awards area.

Below are some examples of award programs using specific organizers, holders, or protectors:

The collection programs can cover scrapbooks, boxes, frames, or other items. These collectors and containers are used to hold a group of these items.

The organizers can be the tabs or other items. They are used to organize the items in the collectors.

The holders are the matte boards, bezels, and the items. They are used to hold the items in the collectors.

The protectors are the plastics, crystals, or other items. They are used to protect the object being collected.

There are other components that can be added, which does not change the program. The market just creates the item to collect but they do not create programs to collect, especially in memorabilia. Memorabilia, like badges, certificates, currency, stamps, etc., do not have a program for collecting such memorabilia.

Any material, any shape, any object, and any production can be used to make these devices. The materials used are being custom made, like laserable plastic, laserable metals, frames, and other materials. The reason the objects on the market are one-sided is because of the way the objects are created.

The box and frame program for collectibles can be used for baseball cards, currency (private and government), and other collectibles. These markets do not have a program for collections. If they provide collections, it is to one-sided market.

Website and Store

Some people are looking for new web site and merchandise. The present invention provides a store and website that helps promote individuals. Many small business struggle except in places like flea markets because they cannot compete with bigger businesses. Over 70% of America is small business. The Memory Product Line™ is memory stores that manufacture the memory products. The Memory Shops™ is where the individuals market their product. PackTheMoment™ is where the memory product line is mixed with the individual product line. The Memory Affiliates™ are companies web sites that are links to other websites. Memory Preservation™ is items or living things that are endangered. Memory Audition™ is a memory product that is worn or used during event, games, season, and other events. They Memory Audition products can be auctioned off after the event.

Collectibles Market

The collectibles and memorabilia market address one item at a time. They also address different products individually, like caps, beanie babies, calendars, etc. With a consistent look and feel, the present invention provides many different ways of packaging these collectibles. With the use of one consistent product, the market can group other collectibles and memorabilia with the consistent item. With consistent packaging, the market takes the consistent collectible or memorabilia and develops new products, such as tracking bands or badges to control events. With a consistent look, the collectibles and memorabilia can then be more appealing to look at in one collection.

The tracking devices use artwork and collectible items. These collectibles are removable and arrangeable. They fit into the program. The technology is always changing and the device can change with the market’s new technology, because of the N-assembly approach. This is why the device is able to handle the new and old technology on the market. The collectible market is not branded today. Memory money created a way to brand the whole memorabilia market.

Award Market

There is no consistent look or feel in the collectibles market across different types of collectibles. An individual can collect a trophy or medallion for sports, a certificate for the completion of education, etc., but these items each have a different look and feel. Since there is a consistent look and feel to the present invention, this product can be sold with other third-party awards as a collectible, or as an award by itself. The object is to create an item small enough to combine with other products or to be included together with items distributed at events. The lack of a program in the awards area makes the awards inconsistent. The detachable and rearrangement features allow individuals to create their program the way they want it.

With a customizable program and customizable device, individuals can get the same look and feel for each award received from an institute and other institutes that adapt this program and presentation.

The detachable object allows individuals to discard the holders and keep the token. This token, statue, or any other object is rearranged and reorganized into a new group setting. It allows the awards to be sent out with invitations for nominations and to be given to individuals for presentations.

Currency Market

In the private currency market, the currency market focuses on one chronological event at a time or one promotional event. In the government market, the currency produced is the same product over and over. Since both markets are manufacturing one ‘currency’ at a time, the currency and coin manufacturers do not look at branding, timelines, etc. These manufacturers do not include personalization, brands, dates, certifications, serializations, descriptions, or any other process that deals with a timeline. Therefore, the packaging techniques and jewelry techniques which are currently used by currency manufacturers are limited to the known currency collectors market. There are no boxes, no dual frames, no jewelry, no calendars, no bezels, no growth frames, no family trees, no patchwork frames, no individual holders, etc. to market the private currency to the general public. The currency market needs a program to collect this currency.

There are no programs to collect currency neatly.

In the private and government sector, currency is a made of one material and one style of manufacturing process is used. Most coins are either die stamped or cast. Thus, known methods do not provide customized coins. The present invention addresses some of the needs of the jewelry market and the use of customized coins or currency in that market. Jewelry manufacturers and other manufacturers do not manufacture for a custom coin market, because the custom coin market is so individualized that it has not been profitable until the present invention. This invention can also use necklace bails, jump rings, charm bracelets, charm necklaces, coin rings, coin bezels, etc. to display these coins. This invention uses watch crystals to frame the artwork. It can slip the crystal over the coin without any jewelry and jewelry lockets can also be used. The present invention can use the combination of watch techniques and locket techniques together. The currency can be used on saddles, belts, etc. The currency can be used as propaganda, ads, messaging, and other forms in the media.

Since this is an assembly technology for the currency market and the jewelry market, this invention can layer technology manufactured objects in between currency, on top of the currency, or the back of the currency. The invention can use the bezel and protect the artwork on the coins. The bezel may be used because there are no bezels in the token and private currency market in the jewelry area. The coins and other currency can to be coated with any material that is clear. The coating material can be a part of the manufacturing process or done at a later time.

The present invention also uses customized frames, boxes, etc. The difference as compared to prior display methods is that this invention can use a dual picture frame. Since the invention is selling collectibles, an expandable or growing frame is necessary. This frame includes a top, middle, or bottom. The middle holds the collection of memorabilia, while the top and bottom can hold collectibles and/or decorations. The frame can be sold as individual units.

The attaching device and material can vary. The patchwork frame is like a collage. There are areas that an individual can fill as needed. The material used to make the frame can vary.

Technology Market

There is minimal use of technology in the collectibles and memorabilia market. There are no databases to track and certify collectable items. There is technology in some new collectibles like mugs, hats, etc., but they do not track their products. There is no technology used in combination with collectibles and memorabilia to track sold items, the value of sold items, etc. Using database technology along with the customization of the present invention can tell more about the item and value of an item which individuals are collecting.

The technology world does not use memorabilia in tracking devices. Buildings, fairs and other events do not use any memorabilia to track.

Storyboards

An additional system and method that can be created with customized coins is a storyboard with the coins inserted in the storyboard. Each coin can be individually customized to tell a part of a story as desired by an individual purchasing the storyboard and coins. For example, an individual may desire to have specific customized events engraved onto a coin such as a birthday, a birth, a wedding or retirement, and then these events can be put into a storyboard that highlights the custom coins. In addition to a stock storyboard which might hold 3, 5, 10, 25 or even more coins, a custom storyboard can be created and additional labeling can be printed, engraved, or laser cut into the storyboard itself. This customization is available because of the system and method of the present invention where the coins are inexpensively customizable for a customer.

A storyboard can also be provided for historical artwork. An example of this is a storyboard with customized engraved coins representing historical, civil, or religious events. For example, a customized storyboard of civil war battles can be created with specific areas or individuals involved in those battles. In addition, if a historical artwork or other historical piece of memorabilia is desired to be packaged with a customized coin storyboard, this provides a method for authenticating that the piece of memorabilia. The storyboards as described can also include artwork on the storyboards.

Another example of a customized storyboard is a memory collection for historical events or political events such as a Freedom collection. This may be a customized storyboard that includes interesting stories from the founding of the United States or other patriotic stories.

The present invention enables individuals to mix memorabilia or other memory items with real coins and/or customized coins and then embed those in a customized or standardized storyboard. One advantage of these devices and items of manufacture is that they can help preserve a part of history or an individual's history. The artwork and the customizations provided in these articles can memorialize buildings or structures on the historical register. As described above, the memory items may also memorialize specific valuable memorabilia, antiques, collectibles, or events in history.

As described above, a consistent look can be provided for jewelry and currency and combined with customized coins and story boards. A consistent look can also be provided that can be combined with artwork or historical objects. The customization of the coins is consistent throughout their size, object content, design, etc. Artwork can also be combined on memory bands and coins may be embedded in those bands as a reminder of specific events.

When these memory coins and greetings are created, a piece of software can also be used as an interpreter that can translate from a foreign language into English or from English into a foreign language such as Spanish. This translation is done by interpreting phrases to first extract the meaning from the foreign language phrase and then a direct translation is made of the interpreted phrases.

Figure 4:
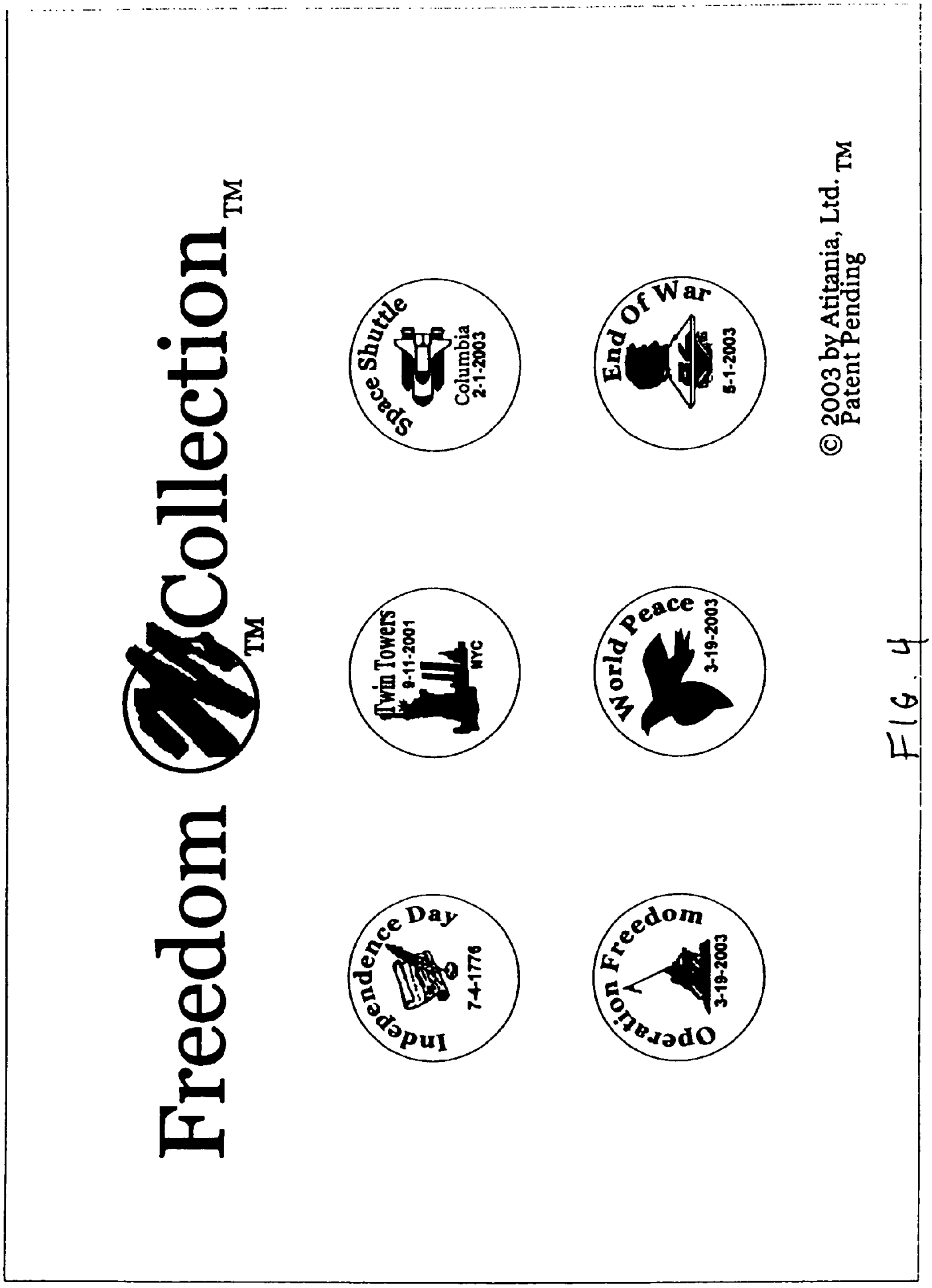
FIG. 4 is a drawing of a storyboard that includes coins.
Figure 5:
FIG. 5 is a matte board for displaying memory money.
Figure 6:
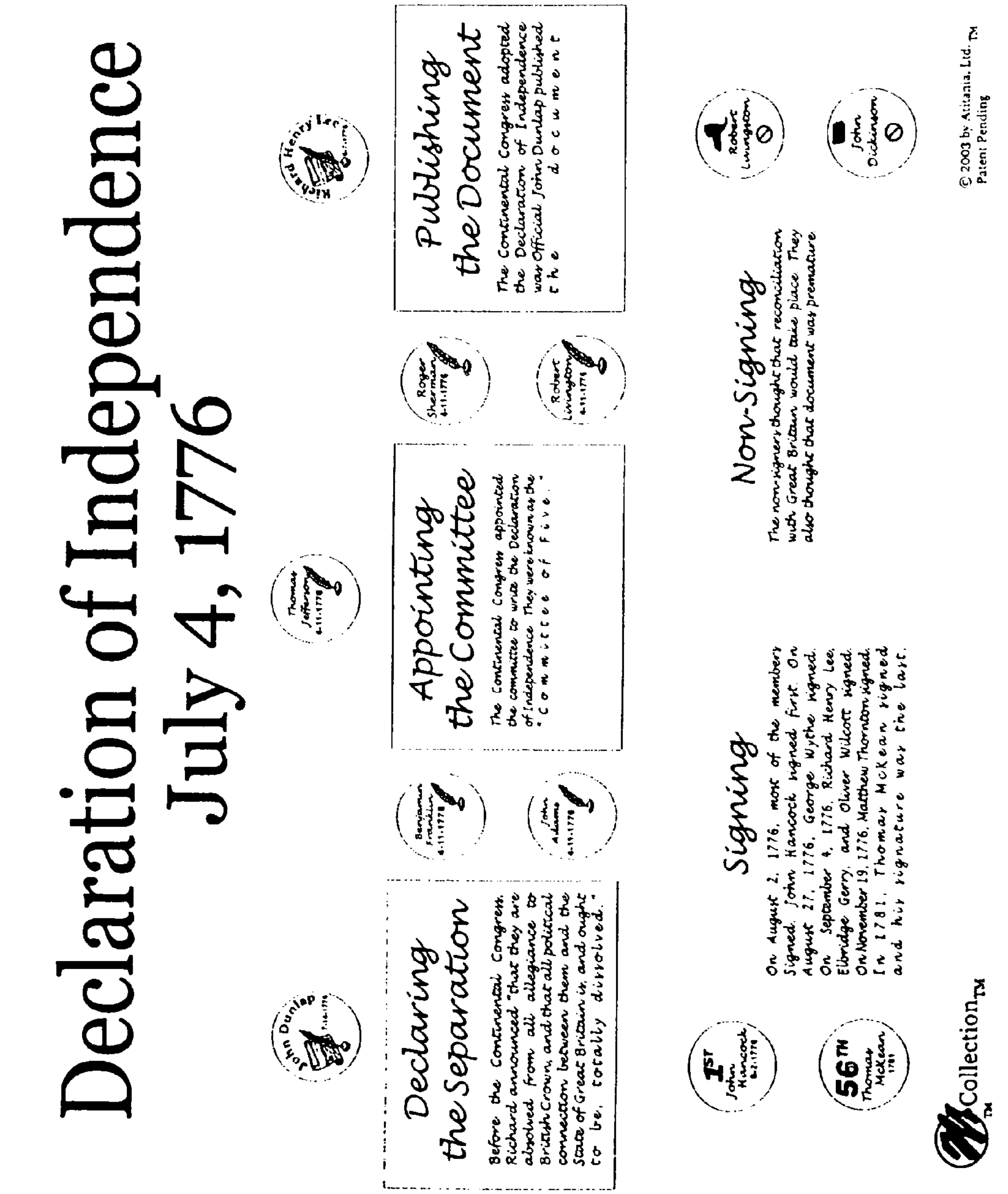
FIG. 6 is a storyboard with coins to tell a story of historical events.

In FIG. 4 is a drawing of a storyboard that includes a single coin and is branded with Memory Money. The storyboard can use through the currency line with any other objects.

The Franklin Mint and other mints as well as other markets do not make storyboards or ways to collect their collectibles. Artist do not use storyboard material to exhibit their creation. Artists can create matte boards, poster boards, and other ways to exhibit their own wares and creation. They do not create titles, stories, and other information about their merchandise. The storyboard can be use on desk as a name plate.

The storyboards can be used title plates for businesses. A company can use acrylic with mat boards or other materials to make removable sign. Some flea markets do not have signs for their monthly vendors. Using a cheap material like matte board along with stable sign that allow for removable allows for vendors to have their sign up each month is valuable.

Memory Money

The present invention can also provide an engraved or laser cut-out money that provides memorabilia for special dates, events, and themes. Memory money provides an exciting and valuable way for individuals and customers to provide gifts for these special occasions. Not only do individuals want to have gifts or other memorabilia that specify dates like birthdays, baptisms, etc., on a coin, but individuals desire to have customized bank style notes for their family members and friends.

Memory money simulates bank notes but it includes a number of additional artistic elements that are cut out of the money. One benefit of memory money is that the bills provide a large reduction in award costs for organizations, governments, and businesses. Another benefit is that the bills preserve memories for events like weddings, baptisms, events, and other themed events. In addition, the memory bills can provide an inexpensive method for museums, cities, and other entities to place a collectible item in their gift shops.

Figure 3:
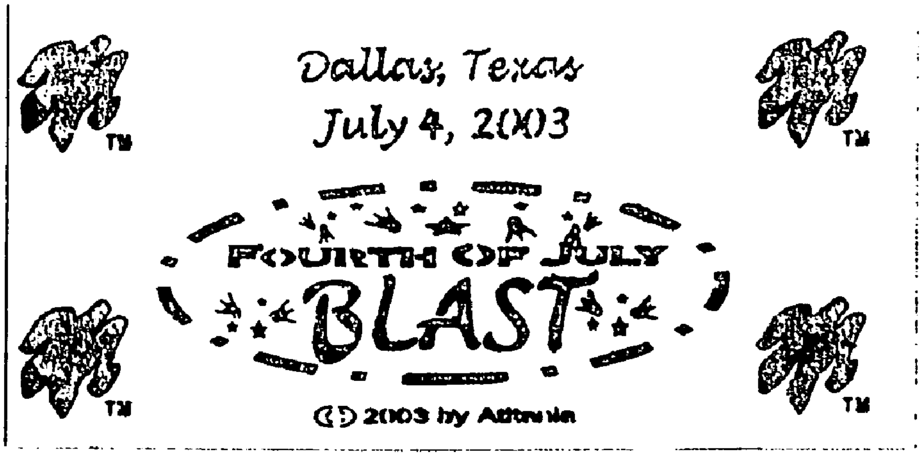
FIG. 3 is a diagram depicting an example of memory money.

Because the cost of the memory money is relatively inexpensive, individuals can buy the memory money and enjoy the memory of their trip or visit to a place. Attached to the memory money or packaged together with the memory money can be a customizable identification tag with artwork that includes branding for the memory money. A photocopy example of memory money is attached as FIG. 3. Memory Money can also be used as a substitute currency for events. The methods that are used in creating a bill can be used for a coin and vice versa.

Method for Manufacturing Memory Bill

Memory money is preferably manufactured by creating a template for the memory money in a computer and then using a laser to cut out perforated artwork in the memory money. In addition, the paper may have printed designs or coloring that simulates money. Not only can these bills be lasered, but they can also be die-stamped to provide an attractive end effect. The memory money is not unlike a party favor, a card for a friend, or similar items that memorializes an event.

In addition to printing, stamping, or lasering memory money, the memory money can be assembled from different components. For example, a stamped, die cut, or laser cut page can be sandwiched together with a colored center page and the back can be another stamped or die cut page. This provides a sandwich type effect where the first front page of the memory money is adhered to a middle colored piece or an artistically decorated piece. This colored piece can show through the die stamps or laser cuts in the first piece. This provides a nice effect and also provides money that is thick enough to serve as memorabilia.

The assembly process allows the manufacturer of the memory money to take a single memory money item and include many different looks or many different processes to create the money. Thus, multiple colors can show through the background, different materials can be cut, or different thicknesses of paper can be cut and applied to the colored material that is the middle layer of the memory money.

In addition, artwork can be applied to the front and back face of the money again through lasering or stamping or the artwork can be applied through printing processes to any of the three layers described. The money can also be manufactured in different combinations with semi-precious or less precious materials. For example, an affordable line of the memory money can be made of paper and or cardstock. Another line could be made of an aluminum foil center with paper adhered to the aluminum foil. A semi-precious form of the money with a gold foil center or a silver center with a silver or aluminum foil attached to the sandwich center. When using aluminum as the outside or inside layer, the aluminum layer can be lasered or engraved and create the flat but durable memory money.

Greeting Market

The assembly methods described here can also be used for greeting cards that can be translated into multiple languages. The greeting cards can have a laser cut or die cut outer layer and then an inner layer. This outer layer can be applied to the center layer. A front and a back may be laser cut or artistically printed and applied to the greeting cards. In addition, a foil layer or some other metal layer can be included as the base or center layer. In addition to the memory money, customized dog tags, ID bands, ID cards, and other tags can be used. These items are used in combination with software to help track entrants of festivals, events, and other paid entry events.

The currency market has been a one process manufacturing business and one material market. For example, bills are printed and are made out of paper. Another example is that coins are die stamped and are made out of just one material or alloy like copper, nickel, copper-zinc, etc.

The greeting card market does not brand the back of the card. Another thing is the market does not have the artwork only in the middle and the front and back use a folded currency bill. The greeting card can have both a card and a coin in the card. The greeting cards use currency. In today's market, this is not true. There are no greeting cards using currency.

Packaging

In the same manner that greeting cards can be manufactured, packaging for memorabilia can also be manufactured in layers with artwork and/or cut layering as desired.

The packaging can be engraved by an engraver to display a memory trademark and then the packaging can have additional artwork engraved on the boxes. These boxes may be paper or wood boxes but they are more likely to be foil, aluminum, brass (bronze), or some similar box that can be kept for a period of time. The packaging for the boxes can be paper sacks, wood or any paper packaging. Packaging can be used with the laser and print technology. Artwork, embossing, or freeform artwork can be added to the packaging.

In addition to simply assembling the money, a protective cover can be placed over the artwork or coin. Examples of a protective cover would be a clear cover like an acrylic that is glued over the coin or memory money. A glass face or some other protective device can be layered over the memory bills or paper in order to protect it in a frame or some similar item.

In some of the packaging there is a way to save it as a collectible. A coupon can be removed from the package. It does not matter how the coupon is removable, but the fact it is removable is valuable. The packaging with memory greetings allows the customer to save the greetings. The packaging can be saved through the program of the boxes, frames, and other collectors.

The coins and memory money can also be recycled or refurbished. The customization that is adhered to the coin (whether aluminum, brass, or some other metal) can be removed and then the coin can be recustomized. As discussed previously, the layered effect of the coin can allow the customized part of the object to be removed and then the remaining more precious part of the coin can have a new face applied to it and it can be re-customized.

Two examples of custom packaging coins and memorabilia will be described here. One example would be wedding or engagement packaging where the engagement ring is packaged with a message coin and an expandable frame can be included with the package. The coin or the package can contain a cake decoration top in the center which says "Will you Marry Me?" and then a separate coin can be used with an acrylic stand and an arrangement of flowers. Each year the individuals can give each other another coin to represent a year of their marriage on their anniversary. These additional coins can be put into an expandable frame and they can keep adding to the frame so that additional coins can be included.

A second example of the memory packaging is for company awards. An expandable frame can include a start date at the company, the company logo in the middle of the frame and a retirement date from the company in a third coin slot. The center of the frame may also be provided with slots for awards which an employee earns while they are working at the company.

Labels

The labels are the same as the packaging. The labels are using the same branding and they are removable. Labels for candy bars, cigar, wine, and other labels are printed or laser technology. The labels then become a part of the memorabilia. There are no removable labels in the market that act a memorabilia. The present invention provides labels that include the "Promotional company by vendor company" or labels by a "Promotional company" with no vendor company.

Trophies

The assembly methods of the present invention can also provide assembled coins that can be applied to a trophy. For example, in some situations an individual may have received a large number of trophies from a specific sporting career such as soccer, golf, baseball, or a similar sporting career. Once the person has received too many trophies, they can remove the currency that has been assembled and adhered to the trophy. These coins can then be rearranged in a storyboard or other attractive wall hanging. It is this combination of a trophy with an assembled coin that provides flexibility which has not been available in the past. The trophies can be the total a money currency, such as a coin.

In the assembly method of the coin, the sandwiched faces of the coin can be layered in multiple layers in anywhere from 1 to N layers that are applied to a base layer. These layers may cover the coin and other layers partially, or leave certain layers and the base exposed as selected. This means that the layers of the coin can be customized and layered in an artwork format. As many layers as desired can be added. However, the coin must retain some semblance of a coin profile. Clearly an overly thick coin would not be desirable to a customer.

The advantage of having a detachable trophy coin is that in the past there have been no awards that can be detached and rearranged. Trophies have not had detachable parts that can be removed and separated as a memorabilia item.

The customizable coins can also be used for promotions such as having customizable images lasered into the coins and the coins can be thrown at a party, concert, or at some similar event. The colors of the coins as they have been assembled can include different colors, signatures, art, numbers, or any other method to identify the currency. The different colors, artwork, or other unique elements in the currency can represent prizes or other items to be collected. This customizable currency can also be attached to other objects such as clothing. When that clothing is no longer desired to be worn, the memory item of the coin can be removed from the clothing and applied to a memory frame or storyboard.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for manufacturing a substantially rectangular memory bill, comprising the steps of:

creating a template for displayed face of the memory bill;

cutting out the displayed face of the memory bill using a laser cutting device;

cutting perforated artwork out of the displayed face of the memory bill using a laser cutting device;

adhering the displayed face directly to a center substrate in the memory bill, wherein the center substrate is a thin metal foil substrate;

creating a template for a back face for a memory bill;

cutting out the back face for the memory bill; and adhering the back face to the center substrate for the memory bill.

2. A method as in claim 1, further comprising cutting a plurality of additional face layers using a laser cutting device and layering the plurality of additional face layers over the displayed face in order to allow underlying layers to been seen through upper layers.

3. A method as in claim 1, further comprising the step of applying a plurality of layers for the displayed face.

4. A method as in claim 1, further comprising the step of applying a plurality of layers for the back face.

5. A method as in claim 1, wherein the thin metal foil is a precious metal selected from the group consisting of silver, gold and platinum.

6. A method as in claim 1, further comprising the step of applying a unique ID to the memory bill based on: a batch number representing a manufacturing run; a machine number, representing a machine that made the memory bill; a sequence number; an event number, which represents a personal life event being recognized; a design number representing a location where the memory bill has been designed; a manufacturing number representing a manufacturing location; a sales tracking number; and a production tracking number.

7. A method as in claim 1, further comprising the step of laser engraving the thin metal foil substrate.

8. A method as in claim 1, wherein the thin metal foil is a semi-precious metal selected from the group consisting of aluminum, copper, nickel, and copper-zinc.

* * * * *